(12) United States Patent
Adil et al.

(10) Patent No.: US 11,230,181 B2
(45) Date of Patent: Jan. 25, 2022

(54) TRANSMISSION FOR A VEHICLE

(71) Applicant: Ningbo Geely Automobile Research & Development Co., Ltd., Ningbo (CN)

(72) Inventors: Shabbir Adil, Hisings Backa (SE); Johannes Larsson, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 17/112,059

(22) Filed: Dec. 4, 2020

(65) Prior Publication Data

US 2021/0086606 A1 Mar. 25, 2021

Related U.S. Application Data (63) Continuation of application No. PCT/CN2019/089267, filed on May 30, 2019.

(30) Foreign Application Priority Data

Jun. 13, 2018 (EP) .................................... 18177579

(51) Int. Cl.
  *B60K 6/48* (2007.10)
  *B60K 6/387* (2007.10)
  *F16D 21/06* (2006.01)

(52) U.S. Cl.
  CPC ............... *B60K 6/387* (2013.01); *B60K 6/48* (2013.01); *B60K 2006/4825* (2013.01); *F16D 21/06* (2013.01)

(58) Field of Classification Search
  CPC .. B60K 6/387; B60K 6/48; B60K 2006/4825; B60K 2006/4833; B60K 6/40;
  (Continued)

(56) References Cited

U.S. PATENT DOCUMENTS 6,428,438 B1   8/2002 Bowen
9,789,757 B2 * 10/2017 Hedman ............... B60W 30/19
(Continued)

FOREIGN PATENT DOCUMENTS

CN   201212541 Y   3/2009
CN   202301522 U   7/2012
(Continued)

OTHER PUBLICATIONS

International Search Report from corresponding International Application No. PCT/CN2019/089267, dated Sep. 2, 2019, 2 pages.

*Primary Examiner* — David J Hlavka
(74) *Attorney, Agent, or Firm* — Tucker Ellis LLP (57) ABSTRACT

A transmission for a vehicle includes a clutch unit connectable to an input shaft of the transmission and an electric motor connected to the clutch unit for transferring torque from the electric motor to the input shaft through the clutch unit. The transmission has a first gear component driven by the electric motor and a second gear component rotationally locked to the clutch unit by an engagement means. The first and second gear components are engaged with each other for transferring torque from the electric motor to the clutch unit. The transmission further has at least one bearing arranged for journaling the second gear component and carrying radial load caused by the electric motor when torque is transferred from the electric motor to the clutch unit. The engagement means is designed to allow a radial run out of the clutch unit relative to the second gear component.

22 Claims, 7 Drawing Sheets

(58) Field of Classification Search
CPC ...... F16D 21/06; F16D 3/18; F16D 2001/103; F16D 3/04; F16D 3/185; F16H 2003/0931; F16H 2057/02047; F16H 2200/0052; F16H 57/021
See application file for complete search history.

(56) References Cited

U.S. PATENT DOCUMENTS

| | | |
|---|---|---|
| 2010/0065353 A1 | 3/2010 | Hobel |
| 2013/0086798 A1 | 4/2013 | Frait |
| 2015/0211607 A1* | 7/2015 | Nakashima .............. B60K 6/48 74/661 |
| 2019/0193550 A1* | 6/2019 | Ziemer ................ F16H 57/043 |
| 2019/0210446 A1* | 7/2019 | Ziemer .................. F16H 3/666 |

FOREIGN PATENT DOCUMENTS

| | | |
|---|---|---|
| CN | 104723862 A | 6/2015 |
| CN | 104786819 A | 7/2015 |
| JP | 201235680 A | 2/2012 |
| WO | 2016168144 A1 | 10/2016 |

* cited by examiner

TRANSMISSION FOR A VEHICLE

RELATED APPLICATION DATA

This application is a continuation of International Patent Application No. PCT/CN2019/089267, filed May 30, 2019, which claims the benefit of European Patent Application No. 18177579.2, filed Jun. 13, 2018, the disclosures of which are incorporated herein by reference in their entireties.

TECHNICAL FIELD

The invention relates to a transmission for a vehicle, which transmission comprises a clutch unit connectable to an input shaft of the transmission and an electric motor connected to the clutch unit for transferring torque from the electric motor to the input shaft through the clutch unit.

BACKGROUND

In an electric vehicle or a hybrid vehicle comprising a transmission with an electric motor for transferring power, the electric motor has to be connected to an input shaft for transferring torque. Conventional solutions usually have an electric motor which is connected via a gear directly to the input shaft or a crankshaft of an engine.

Another solution is to connect the electric motor via a gear coupled to an outer part of a clutch for transferring torque to the input shaft. The electric motor can be connected to the casing of the clutch and the clutch can be connectable to the input shaft for transferring torque from the electric motor to the input shaft.

A clutch is however usually designed for handling axial forces from a clutch shifting mechanism, but not radial forces. If the electric motor is connected to an outer part of the clutch for rotating the clutch, the clutch is also subjected to significant radial load from the electric motor.

A further potential problem with a transmission where the power is transferred from an electric motor to an outer part of the clutch, i.e. at a position radially displaced from the rotation centre of the clutch, is the complexity of the clutch having several separate parts. This will generate a relatively long tolerance chain from the electric motor to the input shaft which may increase the risk of misalignment and problem with radial run out of the clutch relative to the electric motor or the gears connecting the electric motor and the clutch.

SUMMARY

An objective of the invention is to provide a transmission for a vehicle, which transmission eliminates or reduces at least some problem associated with a design where an electric motor is connected to an outer part of a clutch for transferring power to an input shaft.

The objective is achieved by a transmission for a vehicle, wherein the transmission comprises a clutch unit connectable to an input shaft of the transmission and an electric motor connected to the clutch unit for transferring torque from the electric motor to the input shaft through the clutch unit, and the transmission has a first gear component driven by the electric motor and a second gear component rotationally locked to the clutch unit by an engagement means, the first gear component and the second gear component are engaged with each other for transferring torque from the electric motor to the clutch unit, and wherein the transmission further comprises at least one bearing arranged for journaling the second gear component and carrying radial load caused by the electric motor when torque is transferred from the electric motor to the clutch unit, and the engagement means is designed to allow a radial run out of the clutch unit relative to the second gear component.

The invention is based on the insight that by such a transmission the clutch unit can be relieved from radial load when torque is transferred from the electric motor to the clutch unit, and any negative effects originating from a long tolerance chain of the clutch unit can be reduced.

The engagement means can be designed with a radial clearance between the second gear component and the clutch unit for allowing a radial run out of the clutch unit relative to the second gear component. Such a radial clearance will allow the clutch unit and the second gear component to be positioned non-concentrically relative to each other (due to a radial run out). This can be achieved by designing the engagement means with respect to shape and size properly.

Alternatively, or in combination, at least one part of the engagement means is flexible for allowing a radial run out of the clutch unit.

According to one embodiment of the transmission, said at least one engagement means part is made of a resilient material. Hereby, the radial run out can be handled by compression of the resilient part in the radial direction.

According to another embodiment, said at least one engagement means part has flexible fingers for allowing a radial run out of the clutch unit. Hereby, the radial run out can be handled by the fingers being arranged to spring away in the radial direction.

According to a further embodiment, the engagement means is a spline joint. Hereby, a reliable connection can be provided for transferring torque at the same time as assembling of the second gear component and the clutch unit can be performed by displacement of the second gear component and the clutch unit relative to each other in an axial direction.

According to a further embodiment, said at least one second gear component bearing is arranged radially inside of the engagement means. Hereby, the radial load can be effectively carried, and a compact design can be achieved.

According to a further embodiment, said at least one second gear component bearing is arranged in a housing of the transmission, the transmission comprising one or more bearings arranged for journaling a rotor shaft of the electric motor, the electric motor bearings being arranged in said housing. Hereby, the risk of misalignment between the first gear component and the second gear component is reduced since the relative bearing positions can be machined in one and the same piece facilitating a correct centre-to-centre distance to be achieved.

According to a further embodiment, the transmission comprises one first bearing arranged for journaling the second gear component for carrying radial load and a second bearing arranged for journaling the second gear component for carrying axial load. Hereby, both axial and radial load can be handled making it possible to use a less advanced and smaller bearing for carrying radial load as compared to the use of only one bearing for all forces. For example, the first bearing can be a ball bearing and the second bearing can be a roller thrust bearing.

According to a further embodiment, the second gear component has a portion extending from the engagement means inwards in the radial direction, said first bearing being arranged between a housing of the transmission and a radial surface of the second gear component portion for transferring radial load from the second gear component to the housing and said second bearing being arranged between the housing and an axial surface of the second gear component portion for transferring axial load from the second gear component to the housing. Hereby, both axial and radial forces can be handled, and the diameters of the bearings can be kept relatively small which is favourable for high rotation speeds.

According to another aspect of the invention, a further objective is to provide a driveline comprising such a transmission, where the driveline comprises an engine connectable to the clutch unit, and the second gear component is arranged for rotating with the same speed as the engine when the engine being connected to the clutch unit. The engine can be an internal combustion engine.

The advantages of the driveline are substantially the same as the advantages already discussed hereinabove with reference to the different embodiments of the transmission. Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
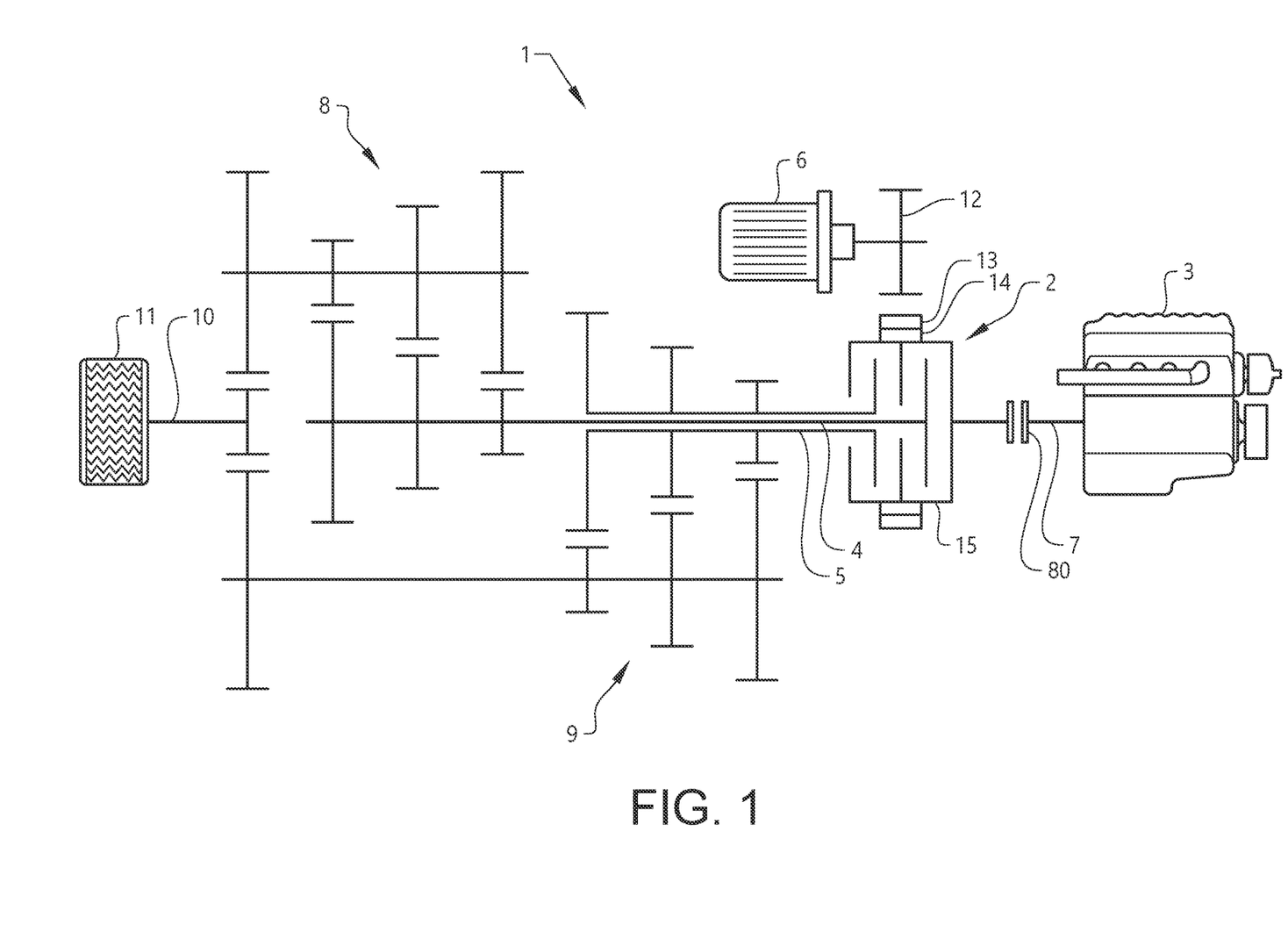
FIG. 1 is a schematic view of a driveline comprising a transmission.

FIG. 1 is a schematic view showing a driveline comprising a transmission 1 for a vehicle. The transmission 1 comprises a clutch unit 2 arranged for transferring torque from an internal combustion engine 3 to an input shaft 4, 5 of the transmission 1. The transmission 1 further comprises an electric motor 6 connected to the clutch unit 2 for transferring torque from the electric motor 6 to the input shaft 4, 5 through the clutch unit 2. Although, in the example embodiment illustrated in FIG. 1, the transmission 1 is part of a driveline comprising an internal combustion engine (ICE) for providing torque to the transmission, other types of driveline can be used. For example, another engine can be used instead of the ICE and full electric drivelines are possible.

The clutch unit 2 in FIG. 1 is a dual clutch by which a crankshaft 7 of the ICE can be selectively connected to a first input shaft 4 and a second input shaft 5 of the transmission 1. When the clutch unit 2 is connected to the first input shaft 4, a first set of gears 8 of the transmission can be used, and when the clutch unit 2 is connected to the second input shaft 5, a second set of gears 9 of the transmission can be used. The first input shaft 4 can be an inner input shaft and the second input shaft 5 can be an outer input shaft, where the inner and outer input shafts are arranged concentrically relative to each other. The transmission 1 has also an output shaft 10 for transferring torque to wheels 11 of a vehicle as schematically illustrated in FIG. 1.

The transmission 1 has a first gear component 12, such as a gear wheel, driven by the electric motor 6 and a second gear component 13, such as a gear ring, rotationally locked to the clutch unit 2 by an engagement means 14. The engagement means 14 will be further described hereinafter with reference to FIGS. 3A, 3B, 4A, 4B and 5.

The first gear component 12 and the second gear component 13 are engaged with each other for transferring torque from the electric motor 6 to the clutch unit 2, and further to some of the input shafts 4, 5. Although the transmission is exemplified by a dual clutch, it should be stressed that also other types of clutch unit can be used, such as for example a triple clutch.

The second gear component 13 is suitably rotationally locked directly to an outer part 15 of the clutch unit 2, and preferably the second gear component 13 is rotationally locked to a casing 15 of the clutch unit 2. The crankshaft 7 of the ICE is also suitably connected to the casing 15 of the clutch unit 2 but in the centre of the clutch unit 2. This means that the second gear component 13 is arranged for rotating together with the internal combustion engine 3 when the internal combustion engine is connected to the clutch unit 2. In other words; the second gear component 13 and the crankshaft 7 will rotate with the same speed 20. In addition, a further clutch 80 can be arranged on the crankshaft 7 between the clutch unit 2 and the ICE.

Figure 2:
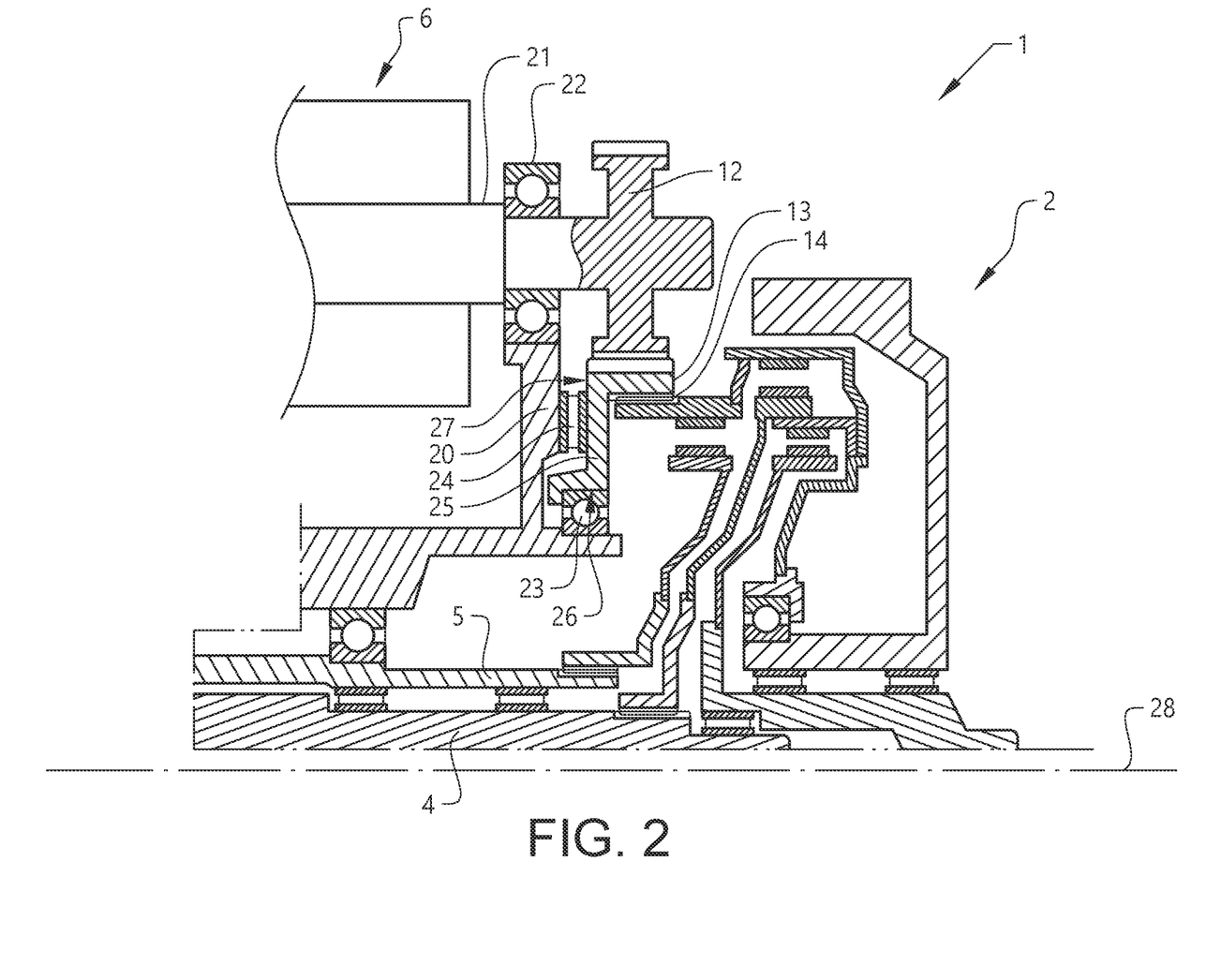
FIG. 2 shows one example embodiment of a transmission.

FIG. 2 shows an example embodiment of the transmission 1. The transmission 1 has a housing 20, a portion of which is shown in FIG. 2. A rotor shaft 21 of the electric motor 6 is journaled by a bearing 22 arranged in the housing 20. The first gear component 12 is arranged on the rotor shaft 21. The second gear component 13 rotationally locked to the clutch unit 2 by the engagement means 14 is journaled by bearings 23, 24 arranged in the housing 20. Only the upper half of the clutch unit 2 is illustrated since the input shafts and the clutch unit are rotationally symmetrical with respect to a centre axis 28.

The transmission 1 comprises at least one bearing 23 arranged for journaling the second gear component 13 and carrying radial load caused by the electric motor 6 when torque is transferred from the electric motor 6 to the clutch unit 2. In the example embodiment illustrated in FIG. 2, the transmission 1 comprises one first bearing 23 arranged for journaling the second gear component 13 for carrying radial load and a second bearing 24 arranged for journaling the second gear component 13 for carrying axial load. The second gear component 13 suitably has a portion 25 extending from the engagement means 14 inwards in a radial direction towards the centre axis 28. By radial direction is meant a direction perpendicular to the centre axis 28.

The first bearing 23 is arranged between the housing 20 of the transmission 1 and a radial surface 26 of the second gear component portion 25 for transferring radial load from the second gear component 13 to the housing 20. The second bearing 24 is arranged between the housing 20 and an axial surface 27 of the second gear component portion 25 for transferring axial load from the second gear component 13 to the housing 20. The first bearing 23 can be a ball bearing and the second bearing 24 can be a roller thrust bearing.

The first bearing 23 for transferring radial load from the second gear component 13 to the housing 20 can suitably be arranged radially inside of the engagement means 14, i.e. at a position closer to the centre axis 28 of the clutch unit 2 and the input shafts 4, 5 than the position of the engagement means 14.

Figure 3A:
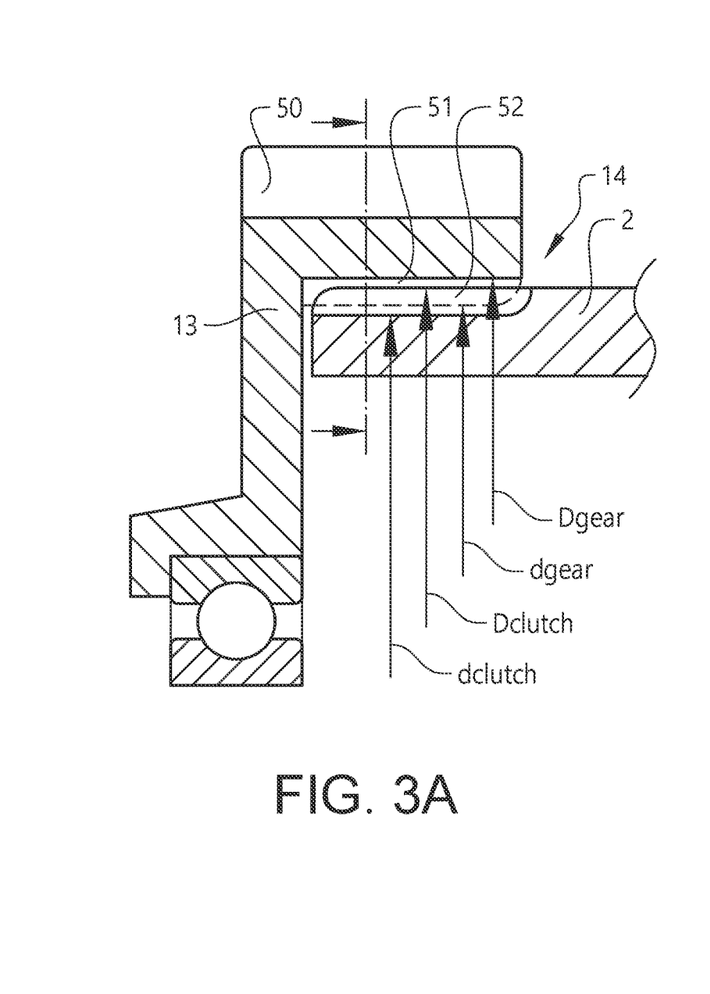
FIGS. 3A and 3B show one example embodiment of an engagement means for connecting a gear component driven by an electric motor and a clutch unit of a transmission.
Figure 3B:
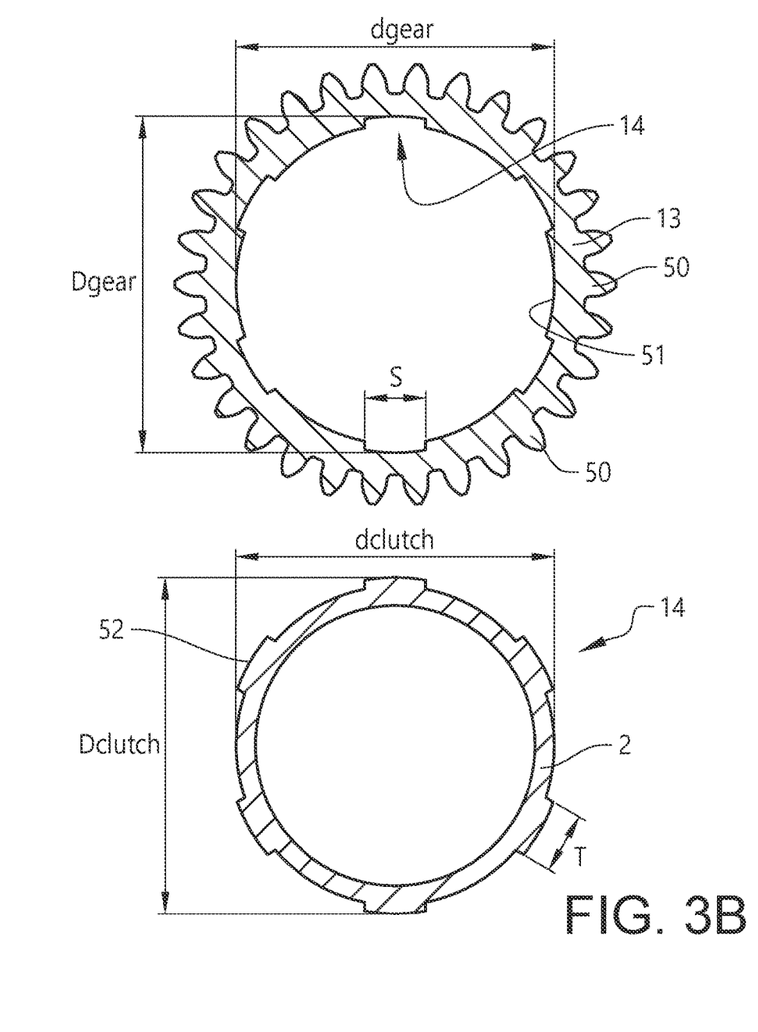

FIGS. 3A and 3B show one example embodiment of an engagement means 14 for connecting the second gear component 13 driven by the electric motor 6 via the first gear component 12 and the clutch unit 2 of the transmission 1 to each other.

FIG. 3A is a cut side view of the second gear component 13 and the clutch unit 2 being engaged to each other. FIG. 3B shows the second gear component 13 and the clutch unit 2 separated from each other in a cross-section view. The engagement means 14 can be a spline joint. The second gear component 13 is suitably a gear ring having teeth 50 arranged on an outer surface of the gear ring for engagement with the first gear component 12, and splines 51 arranged on an inner surface of the gear ring for engagement with the clutch unit 2. The clutch unit 2 is provided with corresponding external splines 52 for connection to the second gear component 13. In another solution, the first gear component 12 connected to the second gear component 13 can be a chain instead of a gear wheel.

The engagement means 14 is designed to allow a radial run out of the clutch unit 2 relative to the second gear component 13. The engagement means 14 can have a radial clearance between the second gear component 13 and the clutch unit 2. For example, the engagement means 14 can have a radial clearance in the interval 0.05-0.5 mm, preferably 0.1-0.3 mm. Such a radial clearance will allow the clutch unit and the second gear component to be positioned non-concentrically relative to each other (due to a radial run out). This is possible for example by designing the splines in a way such that the major diameter $D_{gear}$ of the second gear component 13 exceeding the corresponding major diameter $D_{clutch}$ of the clutch unit 2, and the minor diameter $d_{gear}$ of the second gear component 13 exceeding the minor diameter $d_{clutch}$ of the clutch unit 2, and the space width S of the second gear component 13 exceeding the tooth thickness T of the clutch unit 2.

Alternatively, or in combination with a radial clearance, at least one part of the engagement means can be flexible for allowing a radial run out of the clutch unit.

Figure 4A:
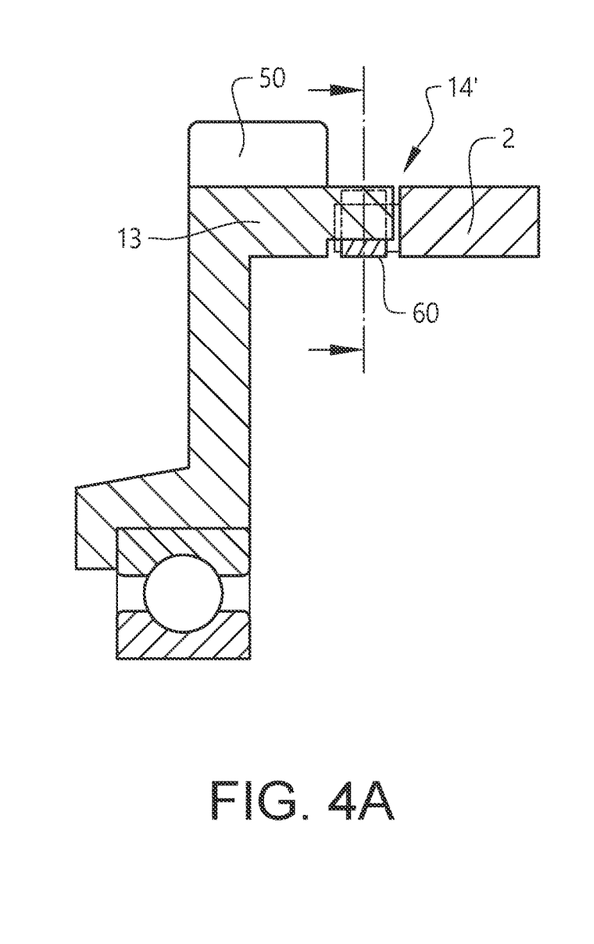
FIGS. 4A and 4B show a further example embodiment of the engagement means.
Figure 4B:
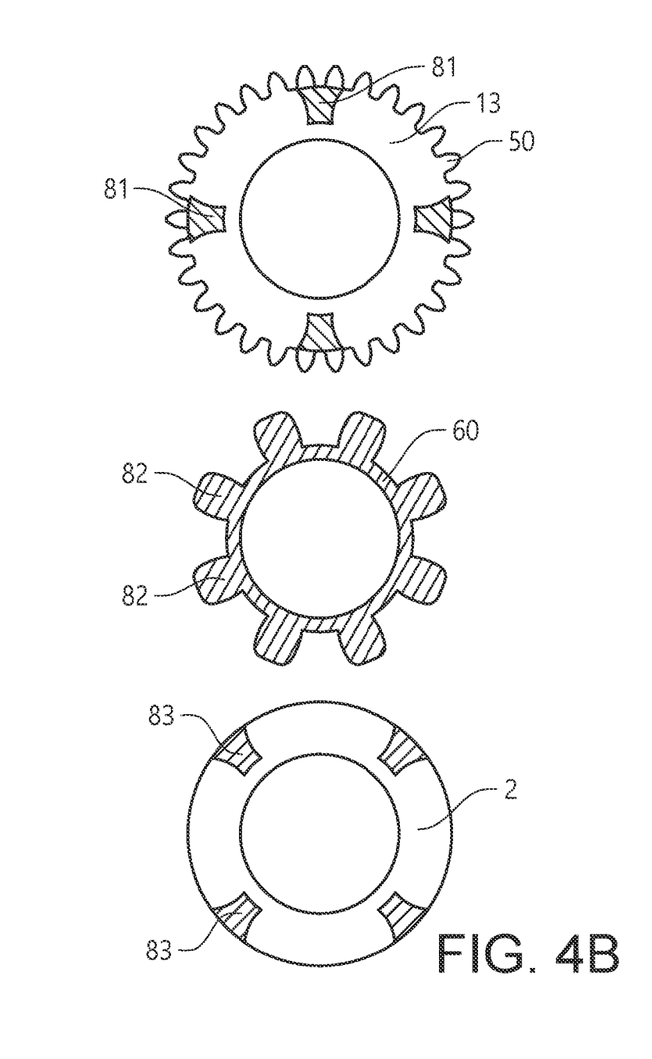

FIGS. 4A and 4B show a further example embodiment of an engagement means 14' for connecting the second gear component 13 driven by the electric motor 6 via the first gear component 12 and the clutch unit 2 of the transmission 1 to each other.

FIG. 4A is a cut side view of the second gear component 13 and the clutch unit 2 being engaged to each other. FIG. 4B shows the second gear component 13, an element 60 of resilient material and the clutch unit 2 separated from each other in a cross-section view.

The flexibility can be achieved by making said at least one engagement means part 60 from a resilient material, such as for example rubber. Other material can also be used, such as plastics, thermoplastics for instance. Said at least one engagement means part has preferably a shore hardness Shore A in the interval 40-70° Sh, preferably 50-60° Sh.

As schematically illustrated in FIGS. 4A and 4B, an element 60 of resilient material, such as rubber, can be arranged between the second gear component 13 and the clutch unit 2. Such an element 60 can be a ring provided with protrusions 82 which ring is arranged between teeth 81 of the second gear component 13 and teeth 83 of the clutch unit 2. The second gear component teeth 81 can protrude in an axial direction from the second gear component and the clutch unit teeth 83 can protrude in an axial direction from the clutch unit. Such a ring 60 should withstand the shear stress when transferring the torque but be able to be compressed radially for allowing the radial run out as previously described.

In another solution the resilient material can be arranged in grooves and/or on tips of splines between the second gear component and the clutch unit for allowing the radial run out, although the torque is transferred directly between the splines of the second gear component and the clutch unit, i.e. not through the engagement means part made of a resilient material.

Figure 5:
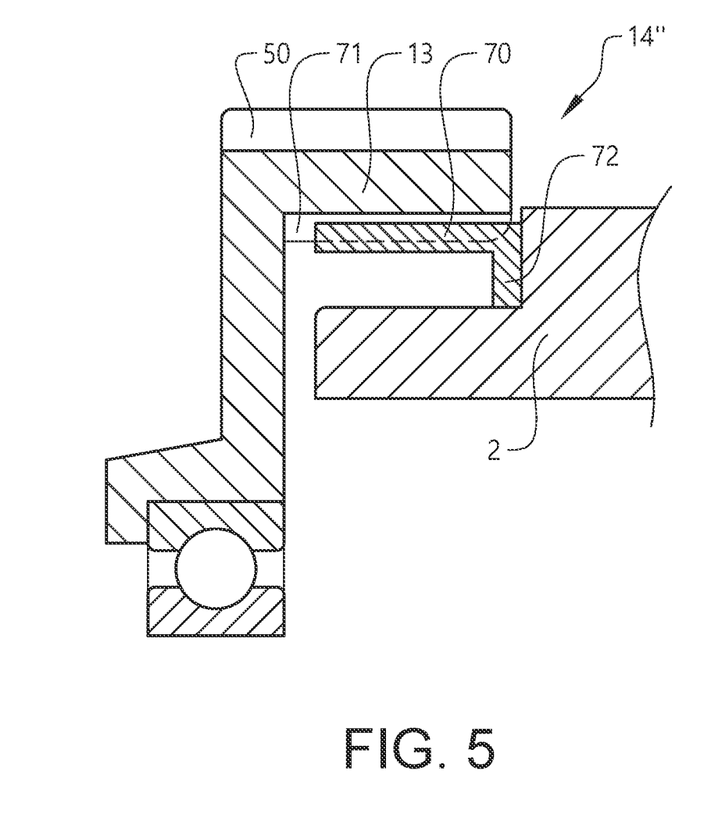
FIG. 5 shows a further example embodiment of the engagement means.

FIG. 5 shows a further example embodiment of the engagement means 14". Alternatively, or in combination with the radial clearance and/or a resilient material, said at least one engagement means part can have flexible fingers 70 for allowing a radial run out of the clutch unit 2. One of the second gear component 13 and the clutch unit 2 can have flexible fingers (the clutch unit 2 in the example embodiment illustrated in FIG. 5) and the other can have grooves 71 receiving the flexible fingers 70. These fingers 70 will transfer the torque between the second gear component 13 and the clutch unit 2 and at the same time they will be able to flex radially for allowing a radial run out. Such fingers 70 can be arranged on a disc 72 which in turn is attached to the clutch unit 2. The fingers are arranged along a circle and point in an axial direction. The number of fingers 70 and the space therebetween can be varied and of course adapted to the grooves 71 of the second gear component 13.

Figure 6:
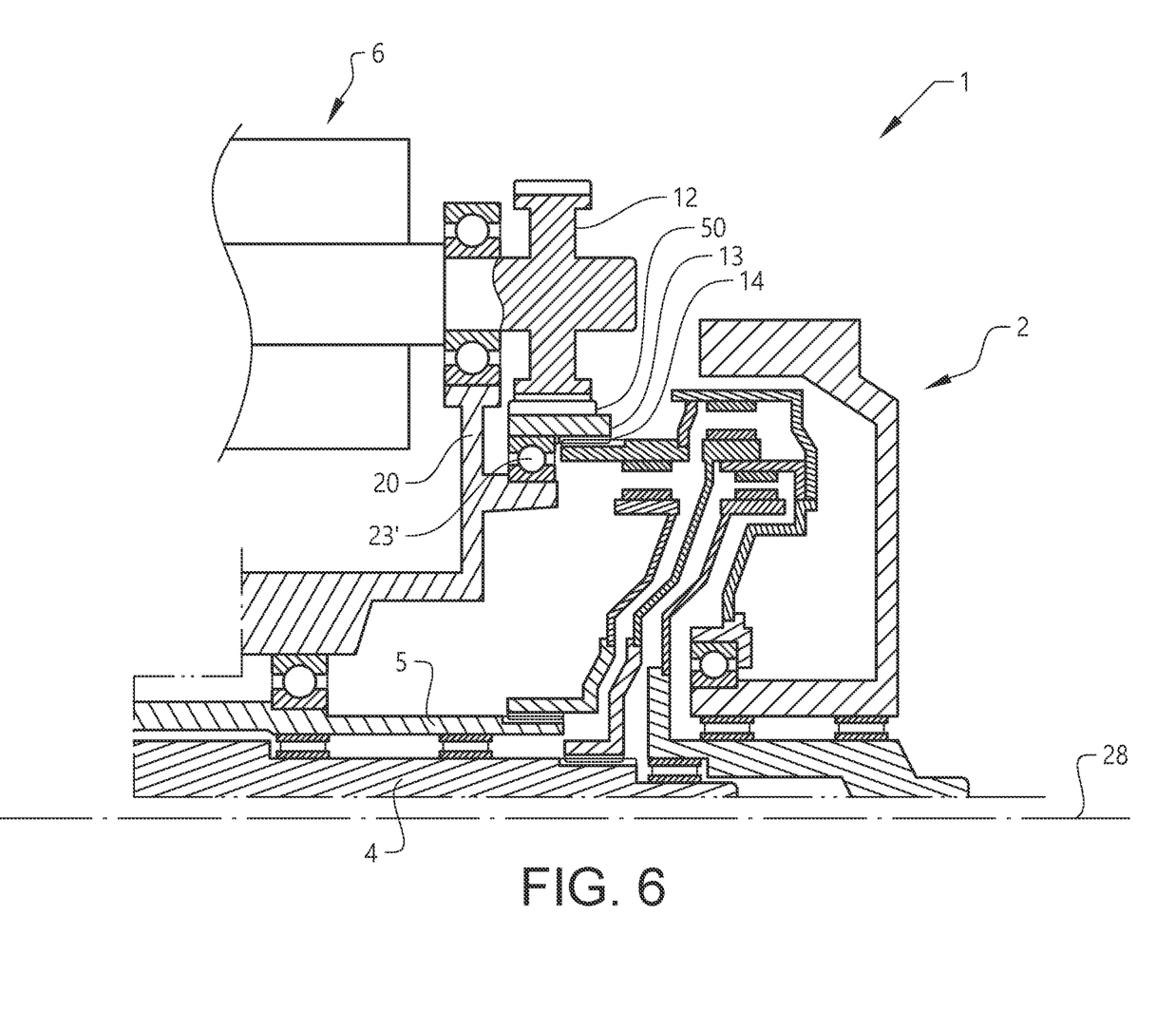
FIG. 6 shows another example embodiment of the transmission.

FIG. 6 shows a further example embodiment of the transmission 1 where the second gear component 13 is journaled by one bearing 23' arranged in the housing 20 of the transmission 1. The bearing 23' is arranged substantially in line with the teeth 50 of the second gear component 13 as seen in the radial direction. Further, the bearing diameter is of the same size as the diameter of spline joint 14 which is somewhat displaced in the axial direction relative to the bearing 23'. In this example embodiment, only one bearing 23' is used for carrying radial load and any axial load caused by the electric motor.

Figure 7:
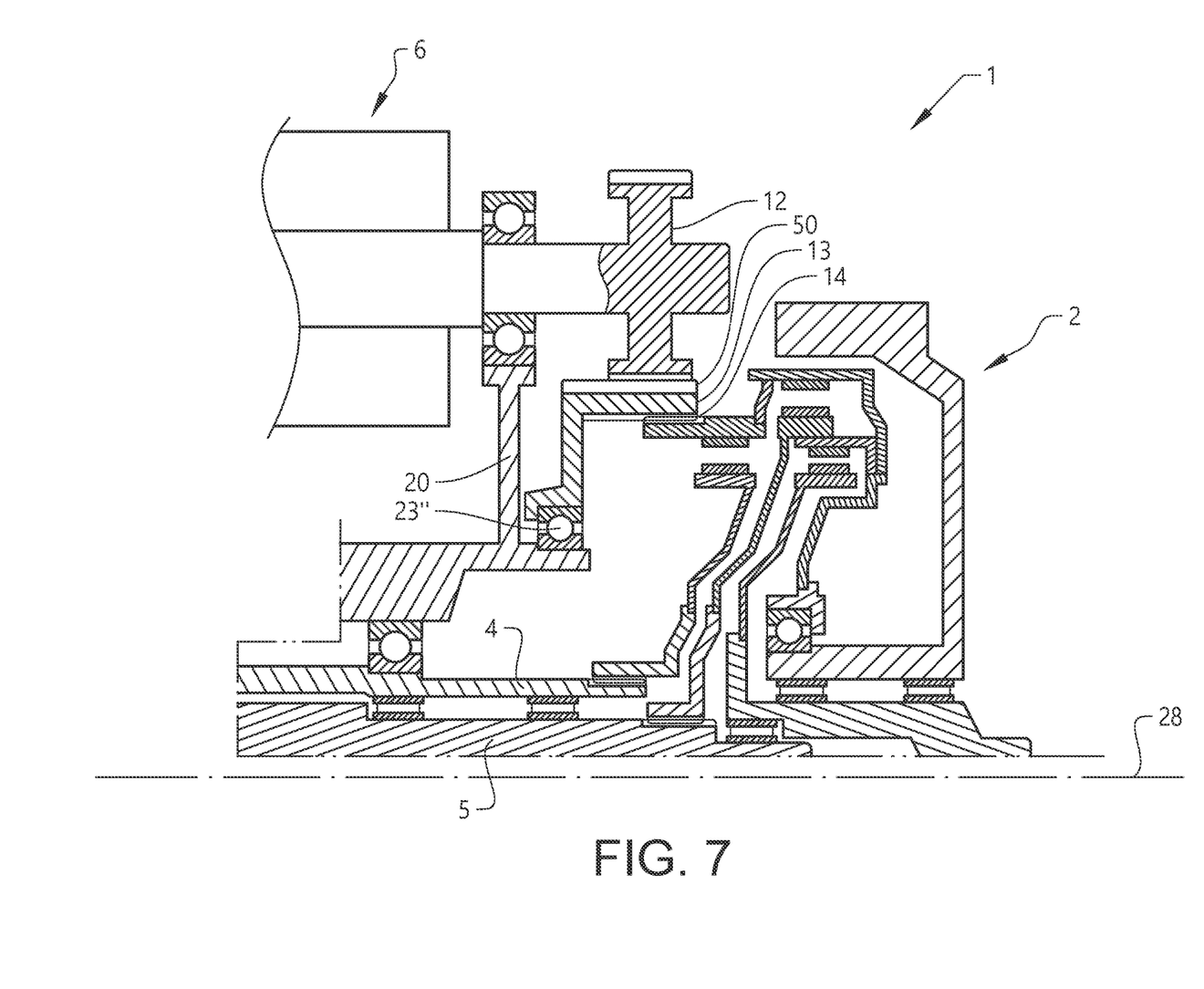
FIG. 7 shows a further example embodiment of the transmission.

FIG. 7 shows a further example embodiment where the second gear component 13 is journaled by one bearing 23" arranged in the housing 20 of the transmission 1. The bearing 23" is arranged axially displaced relative to the teeth 50 of the second gear component 13. Further, the bearing 23" has a diameter which is relatively small as compared to the diameter of the spline joint 14. In this example embodiment, only one bearing 23" is used for carrying radial load and any axial load caused by the electric motor 6.

It is to be understood that the present invention is not limited to the embodiments described above and illustrated in the drawings; rather, the skilled person will recognize that many changes and modifications may be made within the scope of the appended claims.

What is claimed is:

1. A transmission for a vehicle, the transmission comprising a clutch unit connectable to a input shaft of the transmission and an electric motor connected to the clutch unit for transferring torque from the electric motor to the input shaft through the clutch unit, the transmission having a first gear component driven by the electric motor and a second gear component rotationally locked to the clutch unit by an engagement means, the first gear component and the second gear component being engaged with each other for transferring torque from the electric motor to the clutch unit, the transmission further comprising a second gear component bearing arranged for journaling the second gear component and carrying radial load caused by the electric motor when torque is transferred from the electric motor to the clutch unit, the engagement means being designed to allow a radial run out of the clutch unit relative to the second gear component.

2. The transmission according to claim 1, wherein the engagement means has a radial clearance between the second gear component and the clutch unit.

3. The transmission according to claim 2, wherein the engagement means has a radial clearance in the interval 0.05-0.5 mm.

4. The transmission according to claim 1, wherein at least one part of the engagement means is flexible for allowing a radial run out of the clutch unit.

5. The transmission according to claim 4, wherein said at least one engagement means part is made of a resilient material.

6. The transmission according to claim 5, wherein said at least one engagement means part is made of rubber.

7. The transmission according to claim 5, wherein said at least one engagement means part has a shore hardness Shore A in the interval 40-70° Sh.

8. The transmission according to claim 4, wherein said at least one engagement means part has flexible fingers for allowing the radial run out of the clutch unit.

9. The transmission according to claim 1, wherein the engagement means is a spline joint.

10. The transmission according to claim 9, wherein the second gear component is a gear ring having teeth arranged on an outer surface of the gear ring for engagement with the first gear component, and splines arranged on an inner surface of the gear ring for engagement with the clutch unit.

11. The transmission according to claim 10, wherein said second gear component bearing is arranged substantially in line with the teeth of the second gear component in a radial direction.

12. The transmission according to claim 10, wherein said second gear component bearing is arranged axially displaced relative to the teeth of the second gear component.

13. The transmission according to claim 1, wherein said second gear component bearing is arranged in a housing of the transmission, the transmission further comprising an electric motor bearing arranged for journaling a rotor shaft of the electric motor, the electric motor bearings being arranged in said housing.

14. The transmission according to claim 1, wherein said second gear component bearing is arranged radially inside of the engagement means.

15. The transmission according to claim 1, wherein the transmission further comprises another bearing arranged for journaling the second gear component for carrying axial load.

16. The transmission according to claim 15, wherein the second gear component has a portion extending from the engagement means inwards in the radial direction, said second gear component bearing being arranged between a housing of the transmission and a radial surface of the second gear component portion for transferring radial load from the second gear component to the housing and said another bearing being arranged between the housing and an axial surface of the second gear component portion for transferring axial load from the second gear component to the housing.

17. The transmission according to claim 15, wherein the second gear component bearing is a ball bearing and the another bearing is a roller thrust bearing.

18. The transmission according to claim 1, wherein the second gear component is rotationally locked directly to an outer part of the clutch unit.

19. The transmission according to claim 1, wherein the second gear component is rotationally locked to a casing of the clutch unit.

20. The transmission according to claim 1, wherein the clutch unit is a dual clutch.

21. The transmission according to claim 1, wherein the first gear component is a gear wheel.

22. A driveline comprising a transmission according to claim 1, the driveline comprising an engine connectable to the clutch unit, the second gear component being arranged for rotating with the same speed as the engine when the engine is connected to the clutch unit.

\* \* \* \* \*